(12) United States Patent
Tamaki et al.

(10) Patent No.: US 9,274,365 B2
(45) Date of Patent: Mar. 1, 2016

(54) DISPLAY DEVICE AND ANISOTROPIC SCATTERER

(71) Applicants: Tomoegawa Co., Ltd., Chuo-ku, Tokyo (JP); Japan Display West Inc., Chita-gun, Aichi (JP)

(72) Inventors: Masaya Tamaki, Kanagawa (JP); Tatsuya Yata, Kanagawa (JP); Yoko Fukunaga, Kanagawa (JP); Masashi Mitsui, Kanagawa (JP); Hiroto Katagiri, Shizuoka (JP); Masahide Sugiyama, Shizuoka (JP)

(73) Assignees: Japan Display Inc., Tokyo (JP); Tomoegawa Co., Ltd., Tokyo (JP)

( * ) Notice: Subject to any disclaimer, the term of this patent is extended or adjusted under 35 U.S.C. 154(b) by 371 days.

(21) Appl. No.: 13/738,566

(22) Filed: Jan. 10, 2013

(65) Prior Publication Data
US 2013/0229603 A1    Sep. 5, 2013

(30) Foreign Application Priority Data

Mar. 5, 2012   (JP) .................................. 2012-047561

(51) Int. Cl.
*G02F 1/1335*   (2006.01)
*G02B 5/02*    (2006.01)

(52) U.S. Cl.
CPC ........ *G02F 1/133504* (2013.01); *G02B 5/0236* (2013.01)

(58) Field of Classification Search
CPC ................................................ G02F 1/133504
USPC ........................................................ 349/112
See application file for complete search history.

(56) References Cited

U.S. PATENT DOCUMENTS

| | | | |
|---|---|---|---|
| 7,154,672 B2 * | 12/2006 | Harada | 359/558 |
| 7,576,914 B2 * | 8/2009 | Goto | 359/599 |
| 7,773,174 B2 * | 8/2010 | Shimodaira et al. | 349/96 |
| 2014/0160410 A1 * | 6/2014 | Yamamoto et al. | 349/112 |

FOREIGN PATENT DOCUMENTS

| | | |
|---|---|---|
| JP | 2003-114311 | 4/2003 |
| JP | 2004-110055 | 4/2004 |
| JP | 2005-049764 | 2/2005 |
| JP | 2006-047527 | 2/2006 |
| JP | 2009-116126 | 5/2009 |
| JP | 2009-116127 | 5/2009 |
| JP | 2011-185969 | 9/2011 |
| TW | 422930 | 2/2001 |
| WO | WO2012053501 A1 * | 4/2012 |

OTHER PUBLICATIONS

Taiwan Office Action with English translation issued in connection with Taiwan Patent Application No. 101146740, dated Jan. 23, 2015. (9 pages).
Japanese Office Action with English translation issued in connection with Japanese Patent Application No. 2012-047561, dated Mar. 3, 2015. (8 pages).

* cited by examiner

*Primary Examiner* — Richard Kim
*Assistant Examiner* — Kendrick Hsu
(74) *Attorney, Agent, or Firm* — K&L Gates LLP

(57) ABSTRACT

An anisotropic scatterer is configured to allow a scattering characteristic of light in a display region of a display device to have an angle dependence, and is configured to change the scattering characteristic of the light continuously in an in-plane direction.

11 Claims, 14 Drawing Sheets

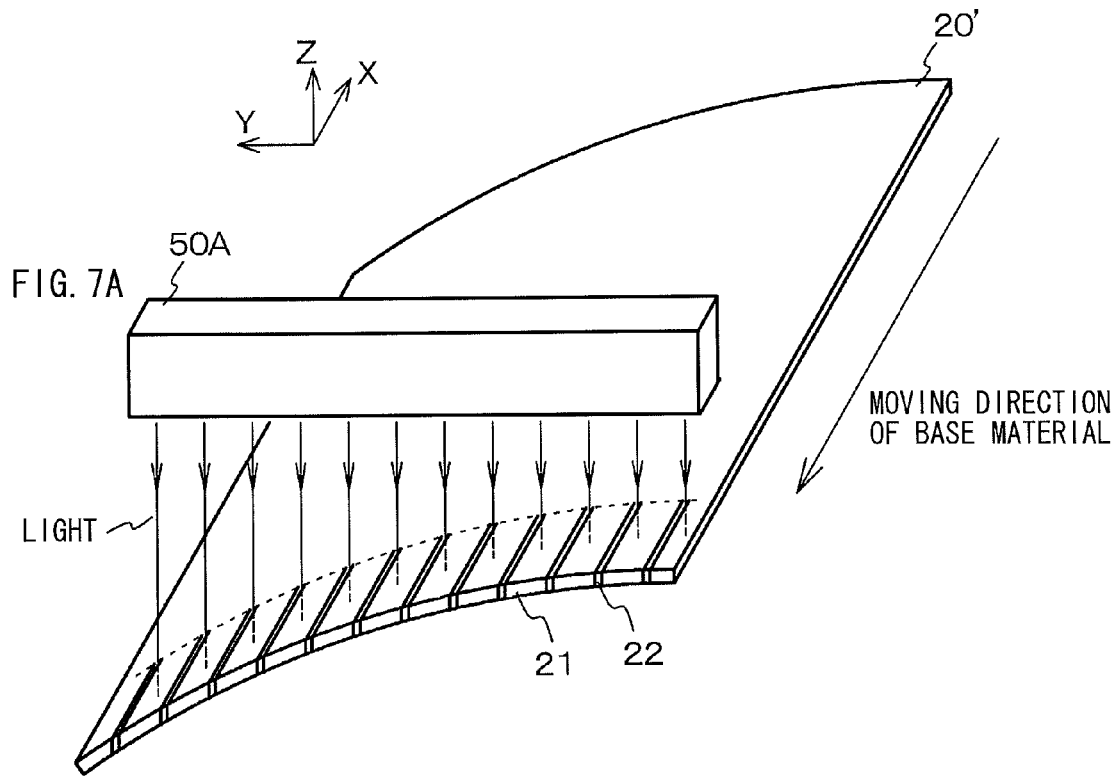
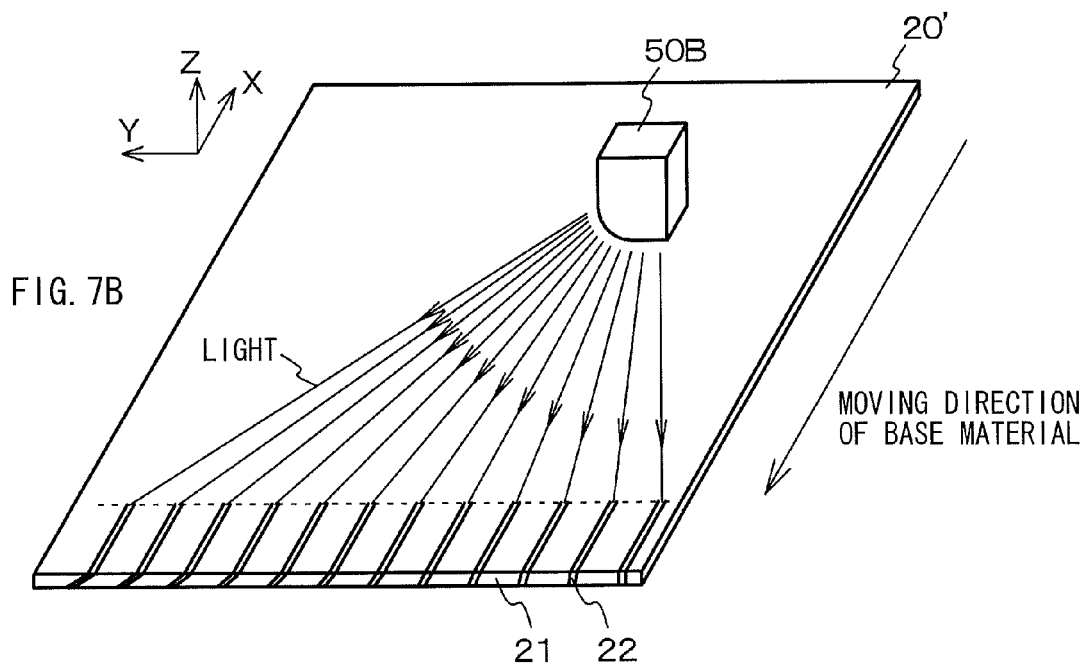

DISPLAY DEVICE AND ANISOTROPIC SCATTERER

CROSS REFERENCES TO RELATED APPLICATIONS

The present application claims priority to Japanese Priority Patent Application JP 2012-047561 filed in the Japan Patent Office on Mar. 5, 2012, the entire content of which is hereby incorporated by reference.

BACKGROUND

The present disclosure relates to a display device and an anisotropic scatterer. More specifically, the present disclosure relates to an anisotropic scatterer used to let a scattering characteristic of light in a display region of a display device have angle dependence, and a display device that includes an image display section using such an anisotropic scatterer as mentioned above.

A reflective image display section that displays an image by controlling a reflectance of outside light is known. For example, a reflective liquid crystal display panel includes a reflector electrode or the like that reflects outside light, and displays an image by controlling the reflectance of the outside light by a liquid crystal material layer. Since the display device that includes the reflective image display section displays the image by utilizing the outside light, it is allowed to attain power consumption reduction, thickness reduction, and weight reduction and hence it is used, for example, as the device for use in portable terminal.

The display device that includes the reflective image display section is allowed to increase the reflectance for a predetermined view position by letting the scattering characteristic of light in the display region of the image display section have angle dependence, thereby to compensate for a reduction in visibility due to a reduction in reflectance incidental to displaying in color and to hinder the image from being viewed from a position deviating from the predetermined view position. A display device that a directional scattering film is disposed on a front surface of a liquid crystal panel as an anisotropic scatterer is described, for example, in Japanese Unexamined Patent Application Publication No. 2004-110055.

SUMMARY

In the display device that includes the reflective image display section including the anisotropic scatterer, the intensity of light that an image viewer sees is changed depending on a value of an incidence angle of outside light and a value of an outgoing angle of exit light, even when the image display section displays an image of the same gray-scale. Therefore, the more the size of the image display section is increased, the more the image viewer will feel non-uniformity in the intensity of light viewed and will have an impression that the image is metal-lustrous in quality.

It is desirable to provide an anisotropic scatterer which allows mitigation of the impression that an image is metal-lustrous in quality, and is used in order to let a scattering characteristic of light in a display region of a display device have angle dependence, and to provide a display device that includes a reflective image display section including the anisotropic scatterer adapted to let the scattering characteristic of light in the display region have angle dependence.

According to an embodiment of the present disclosure, there is provided an anisotropic scatterer being configured to allow a scattering characteristic of light in a display region of a display device to have an angle dependence, and being configured to change the scattering characteristic of the light continuously in an in-plane direction.

According to an embodiment of the present disclosure, there is provided a display device, including a reflective image display section including an anisotropic scatterer, the anisotropic scatterer being configured to allow a scattering characteristic of light in a display region to have an angle dependence. The anisotropic scatterer is configured to change the scattering characteristic of the light continuously in an in-plane direction, to allow, upon viewing from a predetermined view position the display region in which an image of a same gray-scale is being displayed, a luminance of the image to be uniform.

In the anisotropic scatterer according to the above-described embodiment of the present disclosure, the scattering characteristic of the light is set to be continuously changed in the in-plane direction of the anisotropic scatterer. In addition, in the display device according to the above-described embodiment of the present disclosure that includes the anisotropic scatterer, the scattering characteristic of the light in the anisotropic scatterer is set to be continuously changed in the in-plane direction, to allow, upon viewing from a predetermined view position the display region in which an image of a same gray-scale is being displayed, a luminance of the image to be uniform. Therefore, it is allowed to mitigate the impression that the image is metal-lustrous in quality caused by non-uniformity in intensity of light that the viewer sees.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

FIG. 7A and FIG. 7B are schematic diagrams, each illustrating an example of a method of manufacturing the anisotropic scatterer according to the first embodiment.

DETAILED DESCRIPTION

Figure 1:
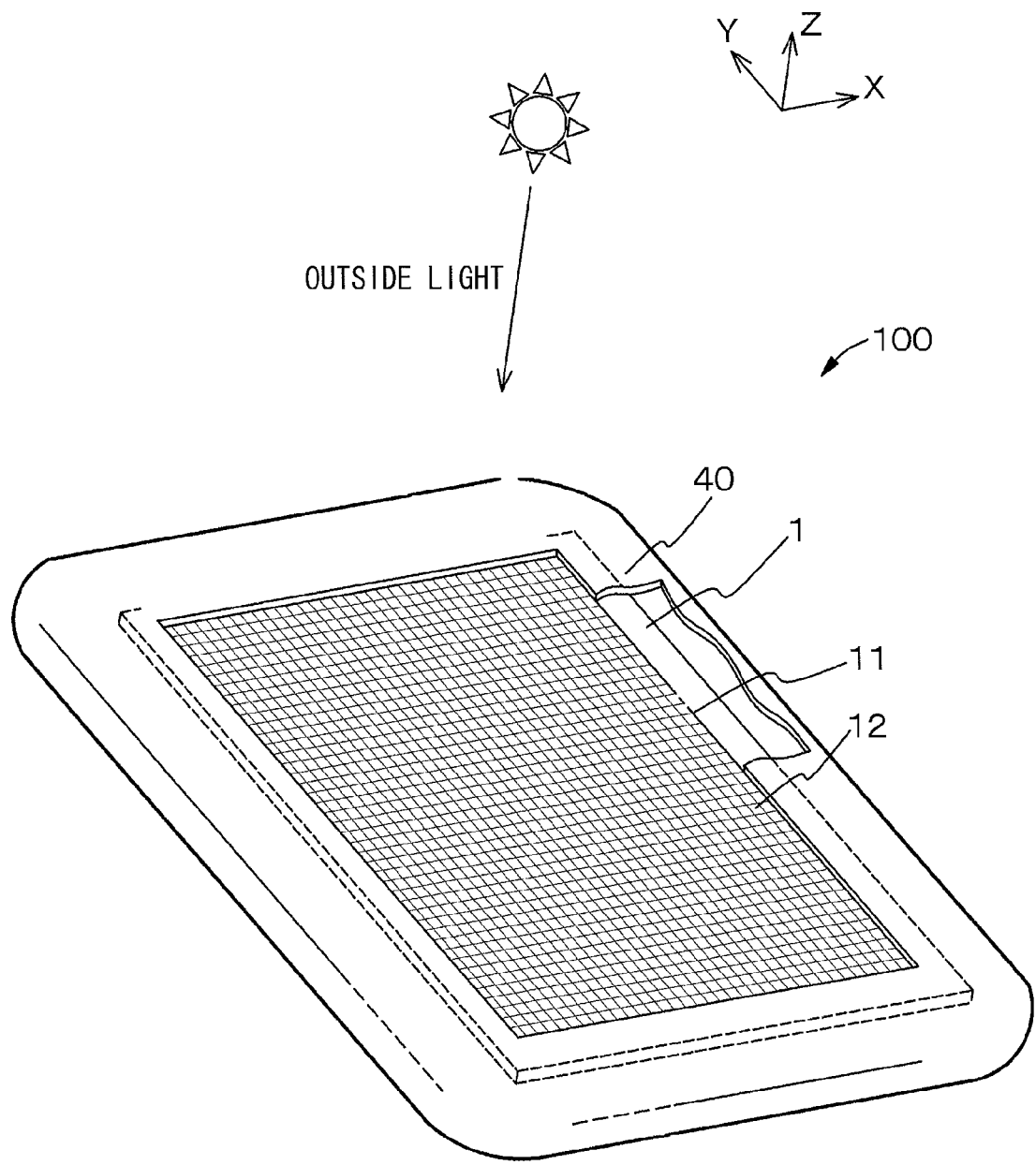
FIG. 1 is a schematic perspective view illustrating an example of a display device according to a first embodiment of the present disclosure.

Next, preferred embodiments of the present disclosure will be described in detail with reference to the accompanying drawings. The present disclosure is not limited to the example embodiments and various numerical values and materials in the embodiments are mere illustrative. In the following description, the same numerals will be used for the same elements or elements having the same functions and repetitive description will be omitted. It is to be noted that description will be made in the following order.

1. General Description on Display Device and Anisotropic Scatterer according to Example Embodiments of the Present Disclosure
2. First Embodiment
3. Second Embodiment (and Others)

[General Description on Display Device and Anisotropic Scatterer According to Example Embodiments of the Present Disclosure]

In an anisotropic scatterer according to an embodiment of the present disclosure, or the anisotropic scatterer (these scatterers will be simply called the anisotropic scatterer according to the present disclosure in some cases, hereinbelow) that a display device according to an embodiment of the present disclosure includes, a scattering characteristic of light is set to be continuously changed in an in-plane direction. It is allowed to make the luminance of an image uniform when a display region where the image of the same gray-scale is being displayed is viewed from a predetermined view position on a reflective image display section that includes the anisotropic scatterer, by favorably setting a change in the scattering characteristic of light. Here, "to make the luminance of the image uniform" encompasses a case that the luminance is sufficiently uniform and also encompasses a case that the luminance is uniform in practical use.

The anisotropic scatterer according to an embodiment of the present disclosure may have such a structure that a scattering central axis of light is set to be continuously changed in the in-plane direction.

In the above mentioned case, such a structure is allowed that a region oriented in the in-plane direction of the anisotropic scatterer is formed as a region in which low refractive index regions and high refractive index regions are mixedly present, and an angle that a boundary between the low refractive index region and the high refractive index region makes relative to a thickness direction of the anisotropic scatterer is set to be continuously changed in the in-plane direction. A difference in refractive index between the low refractive index region and the high refractive index region is preferably about 0.01 or higher in general, is more preferably about 0.05 or higher, and is still more preferably about 0.10 or higher.

Here, the scattering central axis refers to an axis about which an anisotropic scattering characteristic of incident light is exhibited almost symmetrically. In other words, it is the axis that extends in an incidence direction of the most scattering light. An angle that an axial direction of the scattering central axis and a normal direction of a surface of the anisotropic scatterer define is called an extreme angle of the scattering central axis. In the anisotropic scatterer according to an embodiment of the present disclosure, the scattering central axis inclines from the normal direction of the surface of the anisotropic scatterer basically. It is to be noted that although description will be made on the assumption that a direction in which the scattering central axis is projected on the surface of the anisotropic scatterer is parallel with a Y direction for the convenience of description, it is merely illustrative.

Alternatively, the anisotropic scatterer according to an embodiment of the present disclosure may have a structure that a distribution of scattering intensity of light is set to be continuously changed in the in-plane direction.

In the above mentioned case, such a structure is allowable that the region oriented in the in-plane direction of the anisotropic scatterer is formed as a region in which the low refractive index regions and the high refractive index regions are mixedly present, and a degree of change in refractive index near the boundary (including the boundary itself) between the low refractive index region and the high refractive index region is set to be continuously changed in the in-plane direction.

The anisotropic scatterer may be configured by using, for example, a composition that contains a photoreactive compound. For example, it is allowed to obtain the anisotropic scatterer by irradiating a base material that contains a composition that exhibits some change in the refractive index before and after photopolymerization and a photopolymerization initiator with light from a predetermined direction. A material that some change in refractive index is observed between a part where photoreaction occurs and a part where no photoreaction occurs may be appropriately selected from within well-known photoreactive materials such as, for example, polymers and the like having radical polymerizable and/or cationic polymerizable functional groups to be used as the material of the above mentioned composition. Well-known materials that allow, for example, polymerization of the materials having the radical polymerizable and/or cationic polymerizable functional groups by light irradiation may be used as the photopolymerization initiator.

Alternatively, a composition prepared by mixing together two or more kinds of materials of different refractive indices may be used. For example, the anisotropic scatterer may be obtained also by irradiating a base material that contains a composition prepared by mixing together a photoreactive compound and a non-photoreactive polymer compound with light such as, for example, ultraviolet rays or the like from the predetermined direction. A material may be appropriately selected from within well-known materials such as, for example, acrylic resins, styrene resins and the like to be used as the non-photoreactive polymer compound. A composition prepared by mixing together two kinds of photoreactive compounds may be also used.

The base material that contains the above mentioned composition may be obtained by coating the composition, for example, on a film-shaped base substrate made of a polymer material by a well-known coating method.

The photoreacted part and the not-photoreacted part respectively may be configured such that these parts respectively form louver-like regions, for example, as illustrated in later described FIG. 2C, or may be configured such that these parts respectively form a pillar region and a peripheral region surrounding the pillar region, for example, as illustrated in later described FIG. 2D, depending on a material configuring the anisotropic scatterer and a manufacturing method thereof.

A reflective liquid crystal display panel and electronic paper may be given as examples of the reflective image display section included in the display device according to an embodiment of the present disclosure. The reflective liquid crystal display panel includes a reflector (such as a reflector electrode) or the like that reflects outside light, and displays an image by controlling the reflectance of the outside light by a liquid crystal material layer. The electronic paper performs an operation such as, for example, an operation of moving white and black pigments in accordance with the pattern of an image to be displayed to change the reflectance of its surface thereby to display the image. A configuration that the reflective liquid crystal display panel is used as the reflective image display section is preferable from a viewpoint of displaying moving images and color images.

More concretely speaking, such a configuration is allowable that the image display section is formed using the liquid crystal display panel that includes a front substrate, a rear substrate, and a liquid crystal material layer disposed between the front substrate and the rear substrate, and the anisotropic scatterer is disposed on the front substrate side.

In the above mentioned case, such a structure is allowable that the anisotropic scatterer is configured by laminating a plurality of scattering members, and the scattering characteristic of light in at least one of the scattering members is set to be continuously changed in the in-plane direction.

The reflective liquid crystal display panel includes, for example, the front substrate that includes a transparent common electrode, the rear substrate that includes pixel electrodes, the liquid crystal material layer which is disposed between the front substrate and the rear substrate, and the like. A configuration that the pixel electrode reflects light is allowable, and a configuration that a transparent pixel electrode is combined with a reflection film and the reflection film reflects light is also allowable. There is no particular limitation on an operation mode of the liquid crystal display panel unless a reflective displaying operation is hindered. For example, a liquid crystal display panel which is driven in a mode such as a so-called VA (Vertical Alignment) mode and ECB (Electrically Controlled Birefringence) mode may be used.

It is to be noted that, for example, a semi-transmissive liquid crystal display panel that includes both of a reflective display region and a transmissive display region in a pixel is known as an example of a semi-transmissive image display section that has characteristics of both of reflective and transmissive display sections. A semi-transmissive image display section as mentioned above may be used as the case may be. That is, the "reflective image display section" also encompasses the "semi-transmissive image display section".

There is no particular limitation on the shape of the image display section, and to give an example, it may have an oblong rectangular shape or a longitudinal rectangular shape. When the number M×N of pixels in the image display section is denoted by (M, N), several values of the resolution for image display such as, for example, (640, 480), (800, 600), (1024, 768), and the like may be illustrated as the values of (M, N), for example, for the oblong rectangular image display section, and values obtained by mutually replacing the above mentioned values may be illustrated as the values of the resolution, for example, for the longitudinal rectangular display section. However, values are not limited to the above values.

A drive circuit that drives the image display section may be configured using various circuits. These circuits may be configured using known circuit elements and the like.

Various conditions which are presented herein are met when sufficiently settled and also when substantially settled, and presence of various variations which would occur in design or in production is permissible.

First Embodiment

A first embodiment according to the present disclosure relates to the display device and the anisotropic scatterer.

FIG. 1 is a schematic perspective view illustrating an example of a display device according to the first embodiment.

A display device 100 includes a reflective image display section 1 that includes a display region 11 where pixels 12 are arrayed as illustrated in FIG. 1. The image display section 1 includes a reflective liquid crystal display panel and is incorporated into a housing 40. The image display section 1 is driven by a not-illustrated drive circuit or the like. It is to be noted that the housing 40 is illustrated in a partially cut-out state in FIG. 1. Outside light such as, for example, sunlight or the like is incident upon the display region 11. It is supposed that the display region 11 is parallel with an X-Y plane and the side from which an image is viewed is a +Z direction for the convenience of description.

Figure 2A:
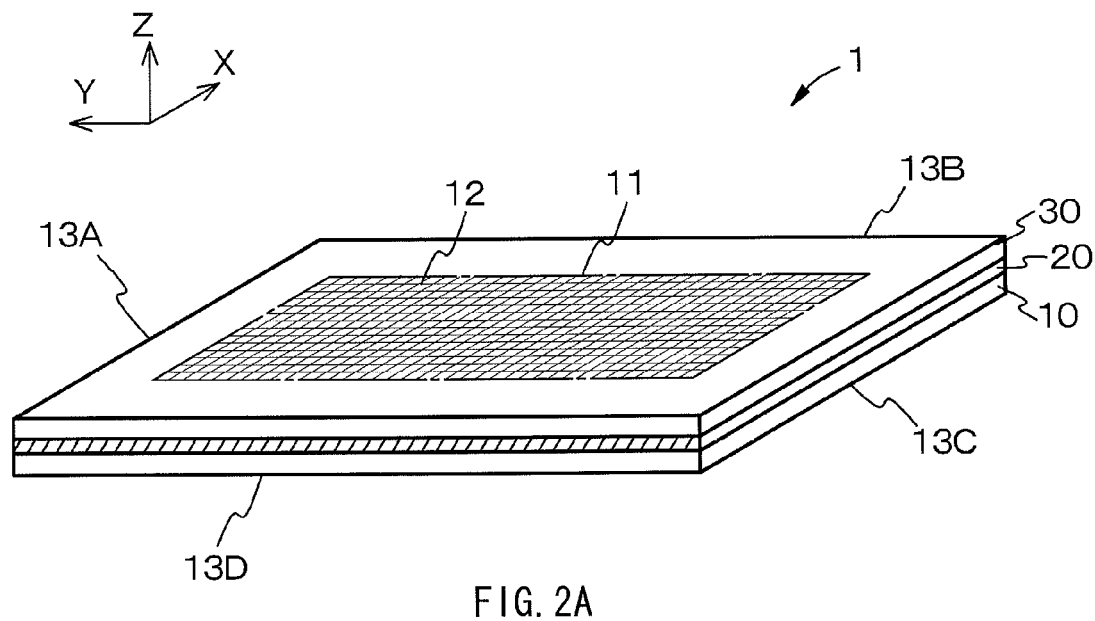
FIG. 2A is a schematic perspective view illustrating an example of a structure of a reflective image display section.
Figure 2B:
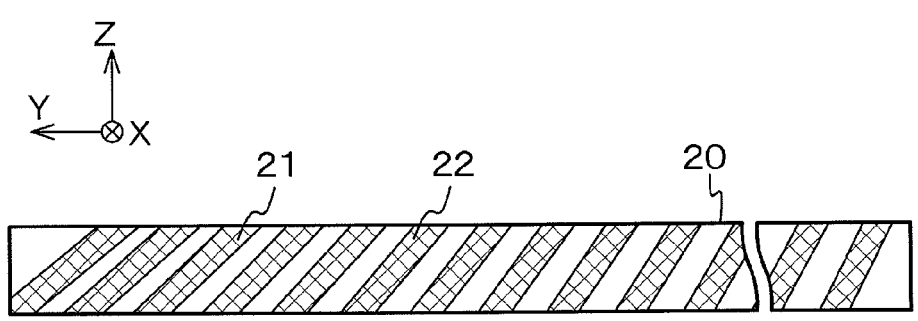
FIG. 2B is a schematic sectional diagram illustrating an example of a structure of an anisotropic scatterer according to the first embodiment.

FIG. 2A is a schematic perspective view illustrating an example of a structure of the reflective image display section. FIG. 2B is a schematic sectional diagram illustrating an example of a structure of an anisotropic scatterer 20 according to the first embodiment. FIG. 2C and FIG. 2D are schematic perspective views, each illustrating an example of an arrangement of low refractive index regions and high refractive index regions in the anisotropic scatterer 20.

Figure 3:
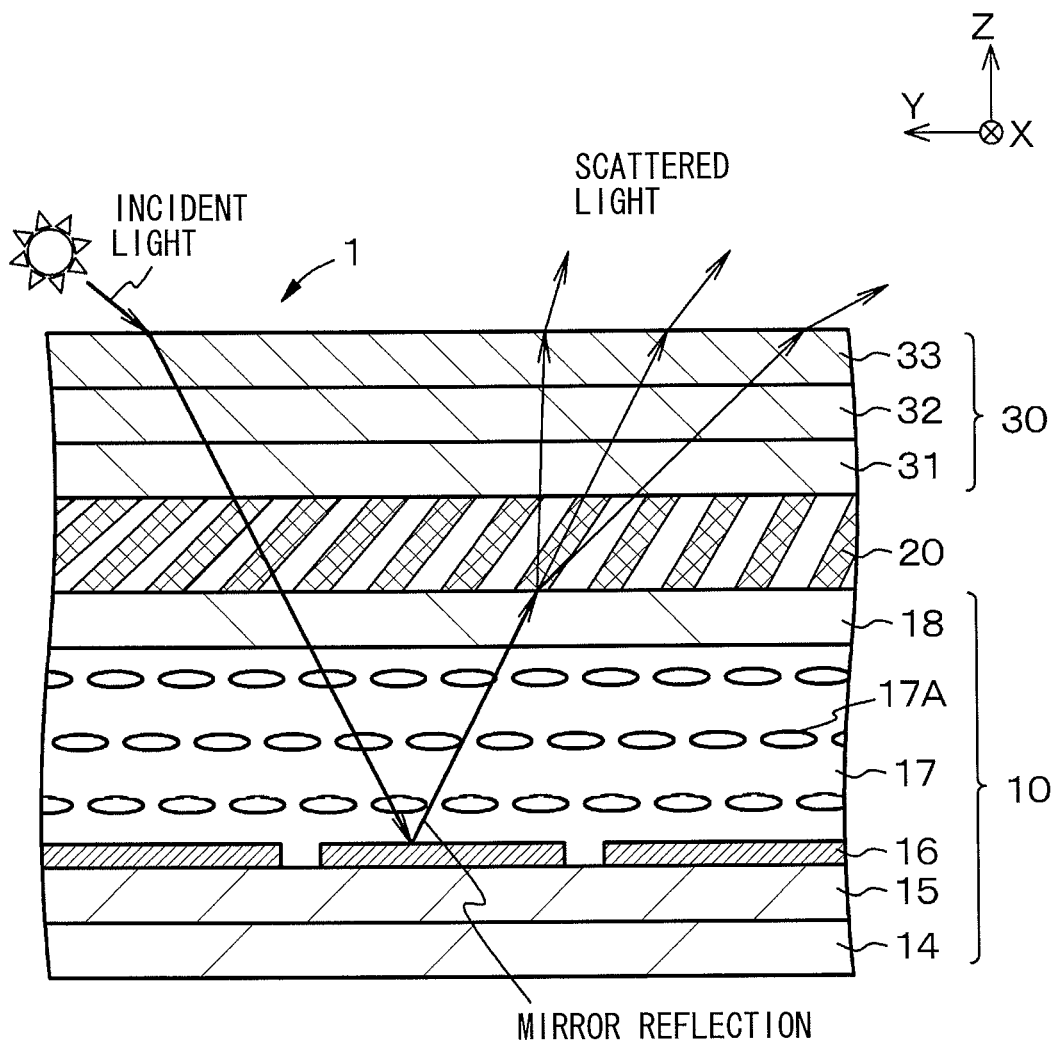
FIG. 3 is a schematic sectional diagram illustrating an example of the reflective image display section.

The image display section 1 illustrated in FIG. 2A includes the reflective liquid crystal display panel that has a front substrate 18, a rear substrate 14, and a liquid crystal material layer 17 which is disposed between the front substrate 18 and the rear substrate 14 as illustrated in later described FIG. 3. A numeral 10 illustrated in FIG. 2A denotes a part of the liquid crystal display panel that includes the front substrate 18, the rear substrate 14, and the liquid crystal material layer 17 which is disposed between the front substrate 18 and the rear substrate 14 which are illustrated in FIG. 3. The anisotropic scatterer 20 is disposed on the front substrate 18 side. A numeral 30 illustrated in FIG. 2A denotes a part of the liquid crystal display panel that includes a quarter-wave plate 31, a half-wave plate 32, and a polarizing plate 33 which are illustrated in FIG. 3.

The image display section 1 may be rectangular and 13A, 13B, 13C, and 13D denote respective sides thereof. The side 13C is a front side, and the side 13A is opposed to the side 13C. For example, each of the sides 13A and 13C is about 12 [cm] in length and each of the sides 13B and 13D is about 13 [cm] in length. However, these values are merely illustrative.

The anisotropic scatterer 20 may be a sheet-like (film-like) element which is, for example, preferably from about 0.02 to about 0.5 [mm] both inclusive in thickness, and more preferably from about 0.03 to about 0.2 [mm] both inclusive in thickness. In the anisotropic scatterer 20, the scattering characteristic of light is set to be continuously changed in the in-plane direction. As described in detail later with reference to later described FIGS. 5A and 5B, the scattering central axis of light is set to be continuously changed in the in-plane direction in the first embodiment.

More concretely speaking, the scattering characteristic of light of the anisotropic scatterer 20 is set to be continuously changed in the in-plane direction so as to make the luminance of an image uniform when viewing the display region 11 where the image of the same gray-scale is being displayed from a predetermined view position.

A region oriented in the in-plane direction of the anisotropic scatterer 20 is formed as a region where low refractive index regions 21 and high refractive index regions 22 are mixedly present, for example, with micron order sizes. It is to be noted that denotation of a transparent film or the like serving as a base of the anisotropic scatterer 20 is omitted in FIGS. 2A to 2D, etc., for the convenience of illustration.

The anisotropic scatterer 20 is configured by, for example, a composition that contains a photoreactive compound. The anisotropic scatterer 20 may have a configuration that the low refractive index region 21 and the high refractive index region 22 are formed into the louver-shaped regions, for example, as illustrated in FIG. 2C, a configuration that the low refractive index region 21 and the high refractive index region 22 respectively form the pillar region and the peripheral region surrounding the pillar region, for example, as illustrated in FIG. 2D, or any other suitable configuration. FIG. 2D illustrates an example in which, for example, a photoreacted composition grows up into the pillar region form so as to have a high refractive index.

Figure 2C:
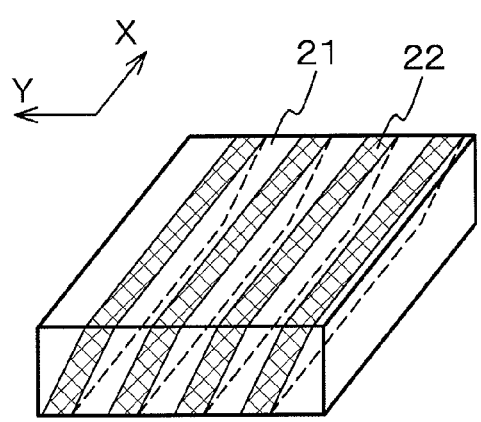
FIG. 2C and FIG. 2D are schematic perspective views, each illustrating an example of an arrangement of low refractive index regions and high refractive index regions in the anisotropic scatterer.

Although a thickness-wise width of each low refractive index region 21 and a thickness-wise width of each high refractive index region 22 are illustrated as if they were fixed in FIG. 2C, these are merely illustrative. Although the shapes of the respective pillar regions are illustrated as if they were the same as one another in FIG. 2D similarly, these are also merely illustrative.

Figure 2D:
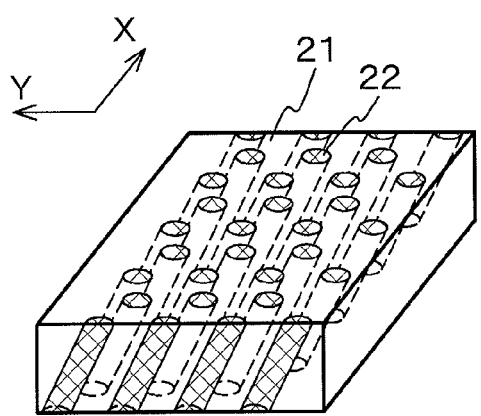

The low refractive index region 21 and the high refractive index region 22 may be obliquely formed within the anisotropic scatterer 20 as illustrated in FIG. 2B to FIG. 2D. Although a scattering central axis S of the anisotropic scatterer 20 is inclined relative to a normal direction (a Z-axis direction) of an view surface of a display device 100 as illustrated in later described FIG. 5B, it is thought that the axial direction thereof almost follows a direction in which the low refractive index region 21 and the high refractive index region 22 extend qualitatively. In addition, in the above mentioned case, it is thought that an orientation that the scattering central axis S is projected onto the X-Y plane directs in a direction orthogonal to a direction in which the louver region extends in the case illustrated in FIG. 2C, and directs in a direction in which the shadow of the pillar region extends when the scattering central axis S has been projected onto the X-Y plane in the case illustrated in FIG. 2D.

Here, it is supposed that the low refractive index region 21 and the high refractive index region 22 are formed as the louver-shaped regions as illustrated in FIG. 2C and a direction in which the louver-shaped regions extend is parallel with the X direction for the convenience of description.

Next, an example of a structure of the image display section 1 will be described with reference to FIG. 3. A flattening film 15 made of a polymer material such as, for example, an acrylic resin or the like is formed on the rear substrate 14 which is made of, for example, a glass material, and a reflector electrode 16 which is made of a metal material such as, for example, aluminum or the like is formed on the flattening film 15. A surface of the reflector electrode 16 is formed into a mirror finished surface shape, and the reflector electrodes 16 are disposed corresponding to the respective pixels 12. An element such as, for example, a TFT (Thin Film Transistor) or the like is connected corresponding to each pixel 12 in order to control electrical connection between a signal line and the reflector electrode 16. It is to be noted that illustrations of TFTs and various wirings such as the signal line and the like are omitted in FIG. 3.

A not-illustrated common electrode which is made of a transparent conductive material such as, for example, an ITO (Indium Tin Oxide) or the like is disposed on the front substrate 18 which is made of, for example, a glass material. Each pixel 12 is formed as a set of sub-pixels and a color filter or the like is disposed corresponding to each sub-pixel for color display. It is to be noted that denotation of the common electrode and the like is omitted in FIG. 3 for the convenience of illustration.

The liquid crystal material layer 17 is disposed between the front substrate 18 and the rear substrate 14. A numeral 17A schematically denotes a liquid crystal molecule contained in the liquid crystal material layer 17. The liquid crystal material layer 17 is disposed to have a thickness with which the liquid crystal material layer 17 will function as a half-wave plate when light goes back and forth therethrough under a predetermined condition by a not-illustrated spacer or the like.

The anisotropic scatterer 20 is disposed on a surface of the front substrate 18 which is opposite to the surface on which the liquid crystal material layer 17 is disposed. Further, the quarter-wave plate 31, the half-wave plate 32, and the polarizing plate 33 are disposed on the anisotropic scatterer 20.

Light which has been incident from the outside is turned into linear polarized light oriented in a predetermined direction by the polarizing plate 33, then a polarization plane thereof being rotated by 90 degrees by the half-wave plate 32, and is then turned into circularly polarized light by the quarter-wave plate 31. The light so turned into the circularly polarized light transmits through the liquid crystal material layer 17, is reflected from the reflector electrode 16, then transmits again through the liquid crystal material layer 17, is scattered by the anisotropic scatterer 20, then transmits through the quarter-wave plate 31 and the half-wave plate 32, and reaches the polarizing plate 33. A voltage to be applied to the pixel electrode and the like is controlled to control an oriented state of the liquid crystal molecule 17A in the liquid crystal material layer 17, by which it is allowed to control the amount of the light that transmits through the polarizing plate 33 after having been reflected from the reflector electrode 16.

Figure 4A:
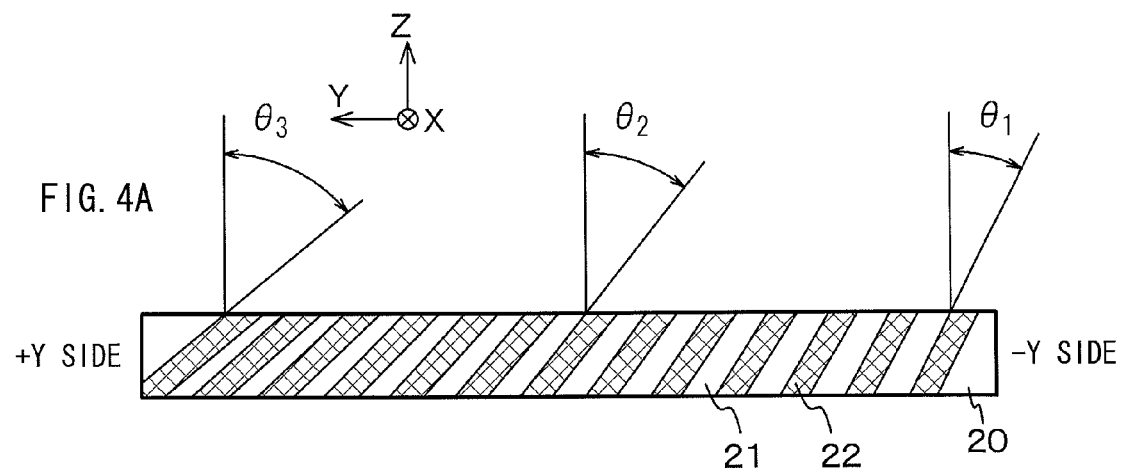
FIG. 4A is a schematic sectional diagram illustrating an example of a structure of the anisotropic scatterer according to the first embodiment.
Figure 4B:
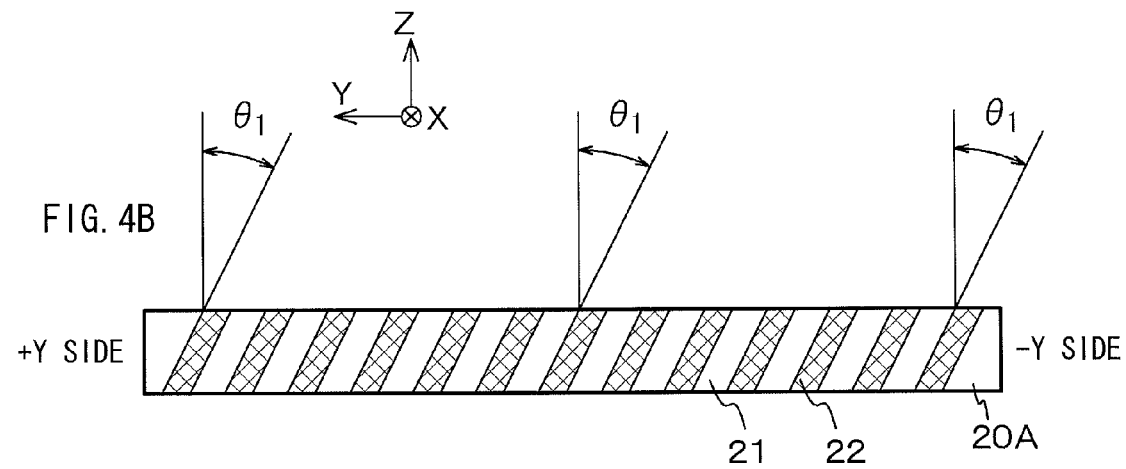
FIG. 4B is a schematic diagram illustrating an example of a structure of an anisotropic scatterer according to a reference example.

FIG. 4A is a schematic sectional diagram illustrating an example of a structure of the anisotropic scatterer 20 according to the first embodiment. FIG. 4B is a schematic sectional diagram illustrating an example of an anisotropic scatterer 20A according to a reference example.

The low refractive index region 21 and the high refractive index region 22 are formed in an inclined state relative to the Z-axis. An angle that the boundary between the low refractive index region 21 and the high refractive index region 22 makes relative to a thickness direction of the anisotropic scatterer 20 is set to be continuously changed in the in-plane direction.

In the anisotropic scatterer 20 according to the first embodiment, the angle that the boundary between the low refractive index region 21 and the high refractive index region 22 makes relative to the thickness direction (the Z direction) of the anisotropic scatterer 20 is set to be increased as it approaches from an end on the −Y direction side toward an end on the +Y direction side. That is, it is set such that an angle $\theta_1$ is obtained on the −Y direction side end (corresponding to the side 13C side in FIG. 2A), an angle $\theta_2$ ($>\theta_1$) is obtained on a central part, and an angle $\theta_3$ ($>\theta_2$) is obtained on the +Y direction side end (corresponding to the side 13A side in FIG. 2A) as illustrated in FIG. 4A.

On the other hand, in the anisotropic scatterer 20A according to the reference example, the angle that the boundary between the low refractive index region 21 and the high refractive index region 22 makes relative to the thickness direction of the anisotropic scatterer 20A is set to an almost fixed value. For example, it is set to be almost fixed at the angle $\theta_1$ regardless of a position thereof in the anisotropic scatterer 20A as illustrated in FIG. 4B.

Figure 5A:
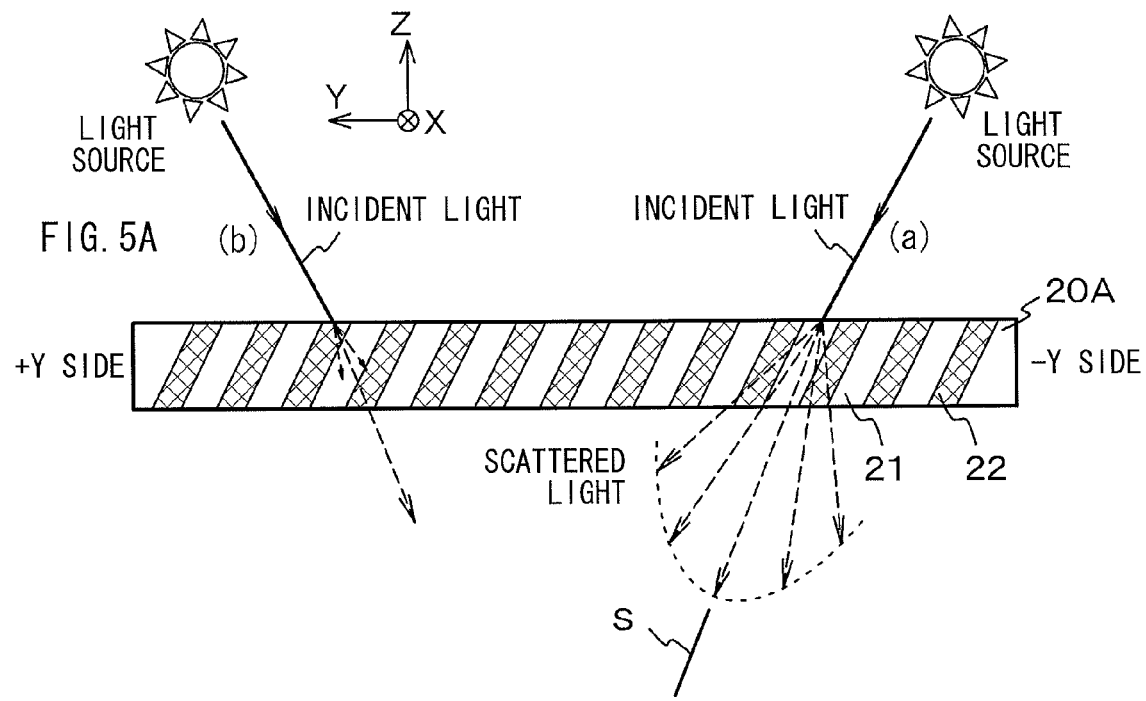
FIG. 5A is a schematic diagram illustrating an example of a relation between incident light and scattered light in the anisotropic scatterer according to the reference example.
Figure 5B:
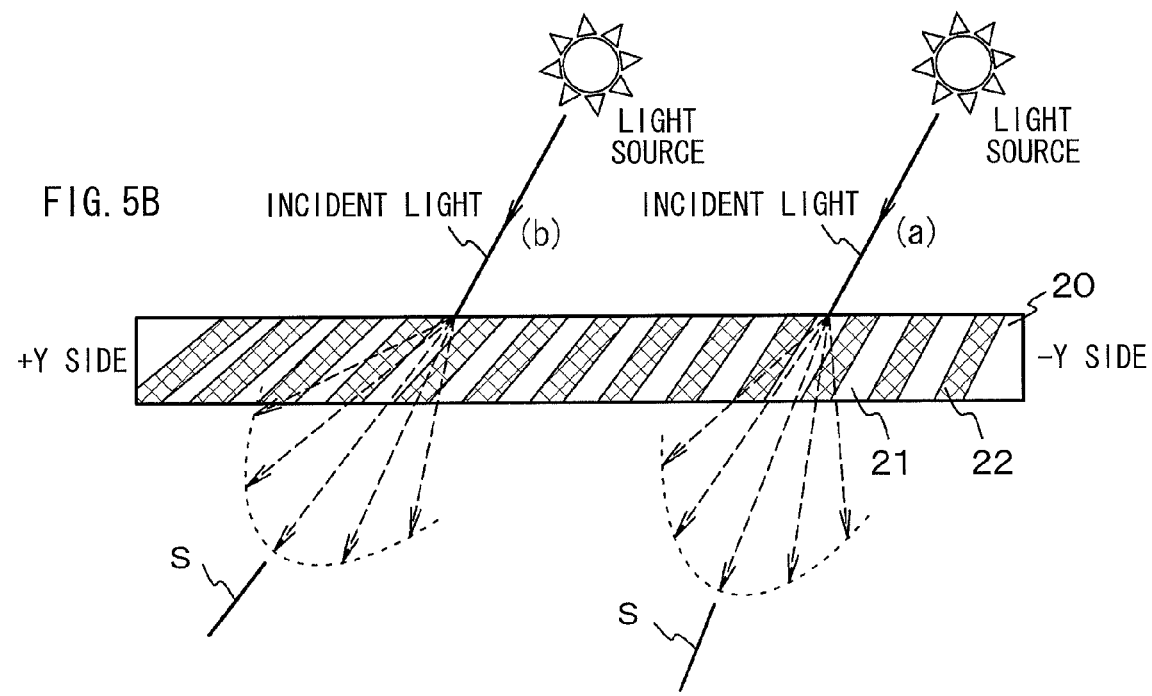
FIG. 5B is a schematic diagram illustrating an example of a change of a scattering central axis of the anisotropic scatterer according to the first embodiment.

FIG. 5A is a schematic diagram illustrating an example of a relation between incident light and scattered light in the anisotropic scatterer 20A according to the reference example. FIG. 5B is a schematic diagram illustrating an example of a change in the scattering central axis in the anisotropic scatterer 20 according to the first embodiment.

When light has been incident upon the anisotropic scatterer 20A from a direction almost following a direction in which the boundary between the low refractive index region 21 and the high refractive index region 22 in the anisotropic scatterer 20A extends as illustrated by (a) in FIG. 5A, the light is scattered and goes out. On the other hand, when light has been incident upon the anisotropic scatterer 20A from a direction almost orthogonal to the direction in which the boundary between the low refractive index region 21 and the high refractive index region 22 in the anisotropic scatterer 20A extends as illustrated by (b) in FIG. 5A, the light transmits through the anisotropic scatterer 20A as it is. Since the angle that the boundary between the low refractive index region 21 and the high refractive index region 22 makes is set to the almost fixed value in the anisotropic scatterer 20A according to the reference example as described above, the scattering central axis S thereof is almost fixed regardless of the position thereof in the anisotropic scatterer 20A.

On the other hand, in the anisotropic scatterer 20 according to the first embodiment, the angle that the boundary between the low refractive index region 21 and the high refractive index region 22 makes relative to the thickness direction (the Z direction) of the anisotropic scatterer 20 is set to be increased as it approaches from the −Y direction side end toward the +Y direction side end. Thus, the scattering characteristic of light is continuously changed in the in-plane direction. Concretely speaking, the scattering central axis S is continuously changed in accordance with a change in position thereof in the Y direction in the anisotropic scatterer 20, as illustrated in FIG. 5B.

Figure 6A:
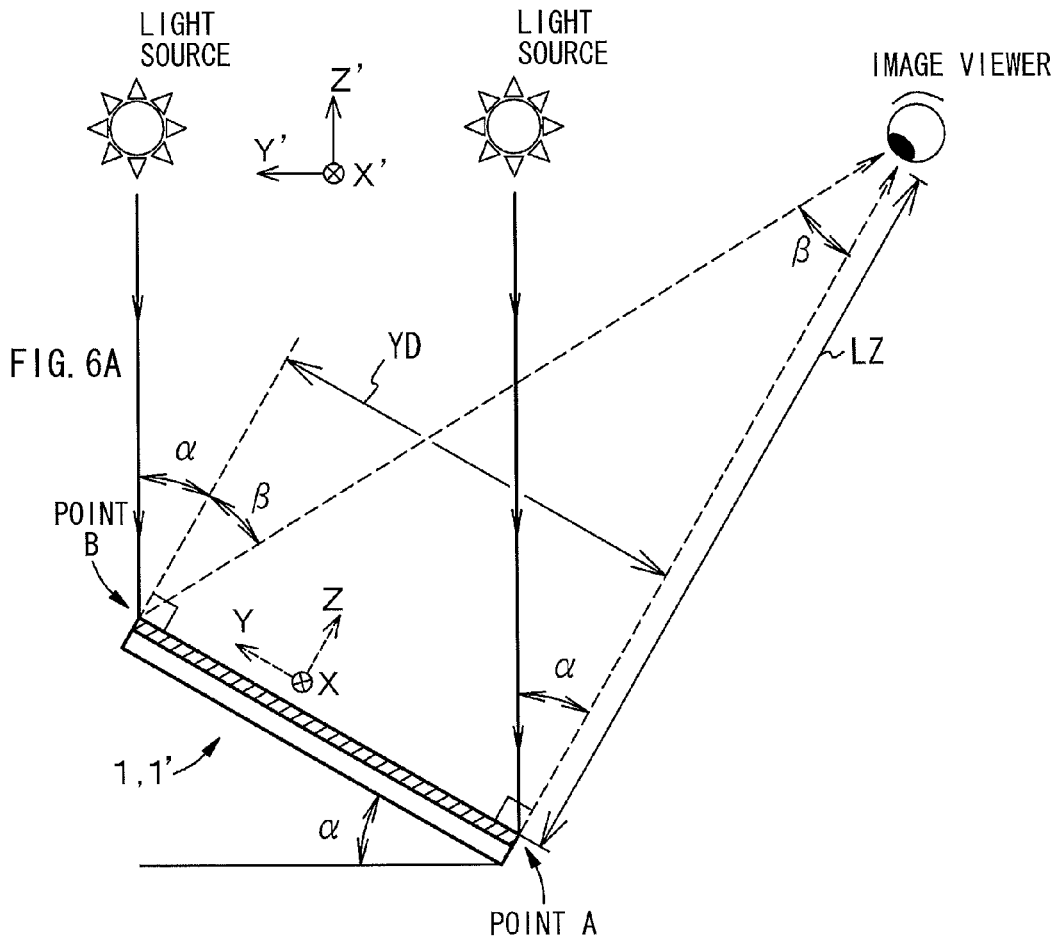
FIG. 6A is a schematic diagram illustrating an example of a positional relation between the display device and an image viewer when parallel outside light is incident.

FIG. 6A is a schematic diagram illustrating an example of a positional relation between the display device and an image viewer when parallel outside light is incident upon the device. Concretely speaking, a situation obtained when the viewer sees an image at a location of a distance LZ from the display region 11 in a state that an outside light incident direction and the normal direction of the image display section 1 make an angle $\alpha$ is illustrated.

An angle $\beta$ which is illustrated in the drawing is determined by an expression $\beta = \tan^{-1}(YD/LZ)$ when YD denotes a length of the image display section 1 in the Y direction. Thus, the longer the length YD is, the more the value of the angle $\beta$ is increased.

Figure 6B:
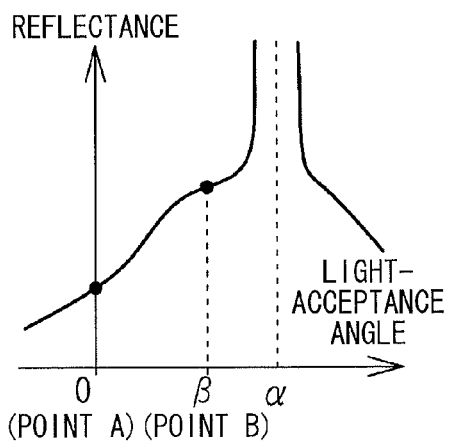
FIG. 6B is a schematic graph for illustrating a situation that the image viewer feels that the image is metal-lustrous in quality when the anisotropic scatterer according to the reference example is used.

A profile of reflective light relative to light which has been incident at the angle $\alpha$ exhibits a characteristic as illustrated in FIG. 6B in a state that an image of the same gray-scale is being displayed on an image display section 1' of the reference example of a configuration that the anisotropic scatterer 20 is replaced with the anisotropic scatterer 20A according to the reference example. In the above mentioned case, the intensity of incident light at a point B in FIG. 6A becomes relatively higher than the intensity of incident light at a point A. Thus, the image viewer feels non-uniformity in the intensity of light viewed and has the impression that the image is metal-lustrous in quality. In addition, since a difference in reflective light intensity between the points A and B is increased as the size of the image display section 1' is increased, the impression that the image is metal-lustrous in quality is strengthened as the size of the image display section 1' is increased qualitatively.

Figure 6C:
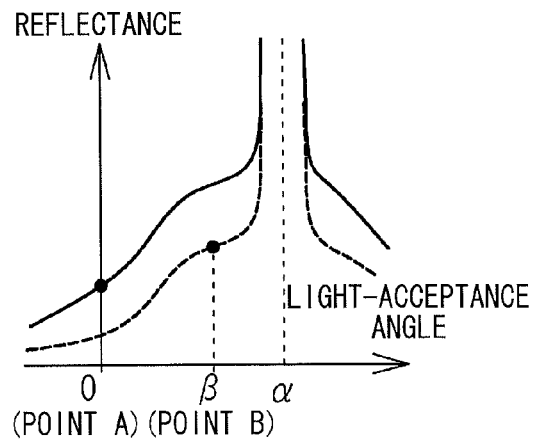
FIG. 6C is a schematic graph for illustrating a situation that it is allowed to mitigate the impression that the image is metal-lustrous in quality by using the anisotropic scatterer according to the first embodiment.

On the other hand, since the scattering central axis S is continuously changed in the image display section 1 that uses the anisotropic scatterer 20 according to the first embodiment illustrated in FIG. 5B, the profile of reflective light at the point B is changed. Thus, since the intensity of the reflective light at the point B approaches the intensity of the reflective light at the point A as illustrated in FIG. 6C, it is allowed to mitigate the impression that the image is metal-lustrous in quality.

It is to be noted that how the angle that the boundary between the low refractive index region 21 and the high refractive index region 22 defines is to be continuously changed relative to the thickness direction of the anisotropic scatterer may be set by appropriately determining a favorable condition by experiment or the like depending on the design and specification of the image display section.

It is allowed to manufacture the anisotropic scatterer 20 according to the first embodiment by irradiating a base material 20', which is prepared by, for example, coating a photoreactive composition that contains a photopolymerizable compound on a substrate such as, for example, a PET (polyethylene terephthalate) film or the like, with light such as, for example, ultraviolet rays or the like so as to continuously change the incident angle.

For example, it is allowed to manufacture the anisotropic scatterer 20 by irradiation, etc., of the base material 20' with light from a light irradiation device 50A that radiates the light in a fixed direction in a state that the base material 20' is bent like a curved surface as illustrated in FIG. 7A. In the above mentioned case, it is allowed to adjust a change in the scattering central axis S of the anisotropic scatterer 20 by adjusting a condition for bending the base material 20'.

Alternatively, the anisotropic scatterer 20 may be manufactured by irradiation, etc., of the base material 20' with light from a light irradiation device 50B that radiates light almost radially in a state that the base material 20' is left flat, for example, as illustrated in FIG. 7B. In the above mentioned case, the change in the scattering central axis S of the anisotropic scatterer 20 may be adjusted by adjusting an optical element such as, for example, a not-illustrated lens or the like included in the light irradiation device 50B.

It is to be noted that although the anisotropic scatterer 20 has been described as a single member in the above mentioned description, it may have a structure that it is configured by laminating a plurality of scattering members.

Figure 8:
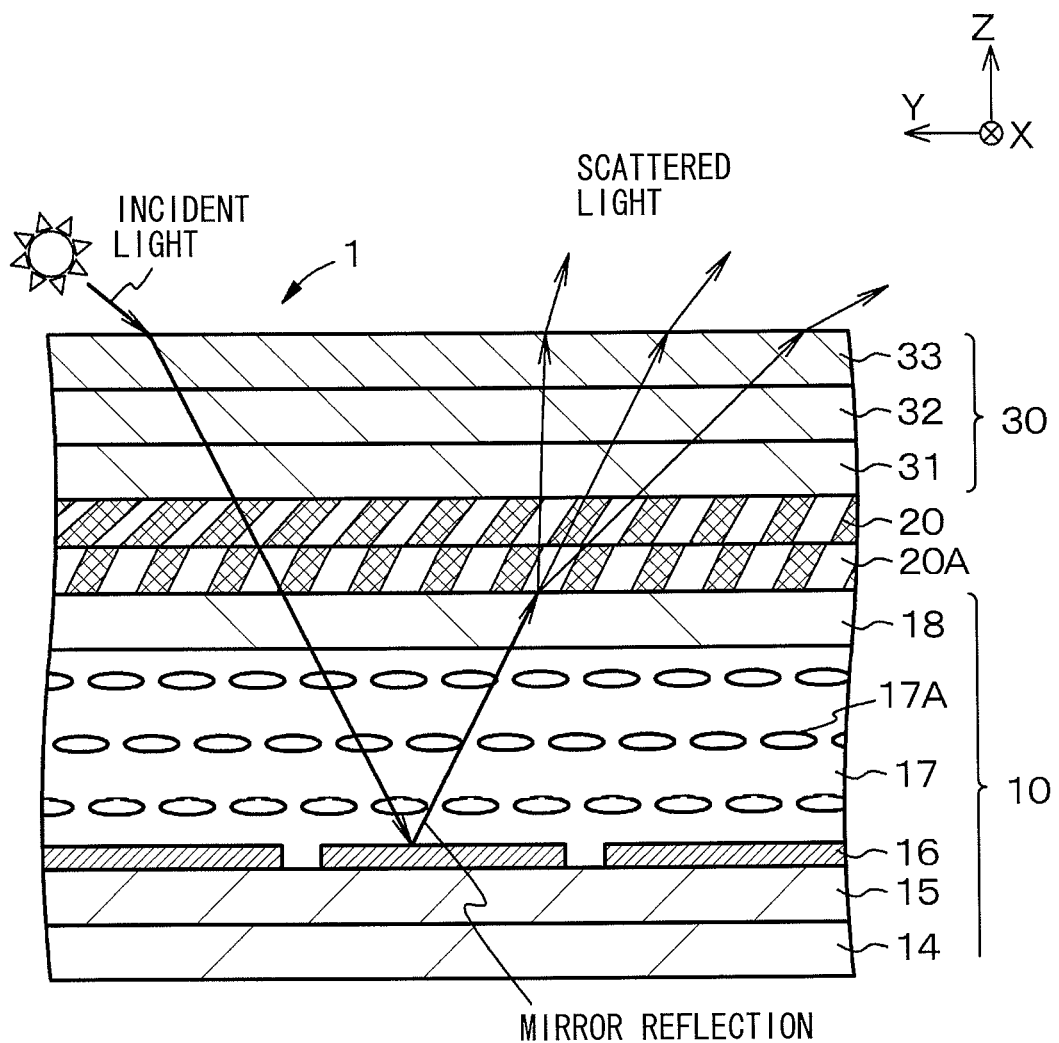
FIG. 8 is a schematic sectional diagram illustrating an example of a reflective image display section according to a modification example.

FIG. 8 is a schematic sectional diagram illustrating an example of a reflective image display section according to a modification example.

In this modification example, the anisotropic scatterer is configured by laminating the anisotropic scatterer 20A of the configuration illustrated in FIG. 5A and the anisotropic scatterer 20 of the configuration illustrated in FIG. 5B. In a configuration as mentioned above, the scattering characteristic(s) of light in one or more anisotropic scatterer(s) may be set to be continuously changed in the in-plane direction.

Second Embodiment

A second embodiment according to the present disclosure also relates to the display device and the anisotropic scatterer.

In the second embodiment, a distribution of scattering intensity of light of an anisotropic scatterer 220 is set to be continuously changed in the in-plane direction. More concretely speaking, a region oriented in the in-plane direction of the anisotropic scatterer 220 is formed as a region in which low refractive index regions and high refractive index regions are mixedly present, and the degree of change in refractive index near the boundary (including the boundary itself) between the low refractive index region and the high refractive index region is set to be continuously changed in the in-plane direction. Thus, the scattering characteristic of light is continuously changed in the in-plane direction.

More concretely speaking, the scattering characteristic of light in the anisotropic scatterer 220 is set to be continuously changed in the in-plane direction so as to make the luminance of an image uniform when the display region 11 where the image of the same gray-scale is being displayed is viewed from a predetermined view position.

A display device 200 according to the second embodiment is the same as the display device 100 according to the first embodiment in configuration excepting that the structure of the anisotropic scatterer 220 is different from that of the anisotropic scatterer 20 in the first embodiment. A schematic perspective view of the display device 200 according to the second embodiment is obtained by replacing the image display section 1 illustrated in FIG. 1 with an image display section 2, and by replacing the display device 100 with the display device 200 and hence will be omitted. In addition, a schematic perspective view for illustrating the structure of the image display section used in the second embodiment is obtained by replacing the anisotropic scatterer 20 illustrated in FIG. 2A with the anisotropic scatterer 220, and by replacing the image display section 1 with the image display section 2 and hence will be omitted.

Figure 9A:
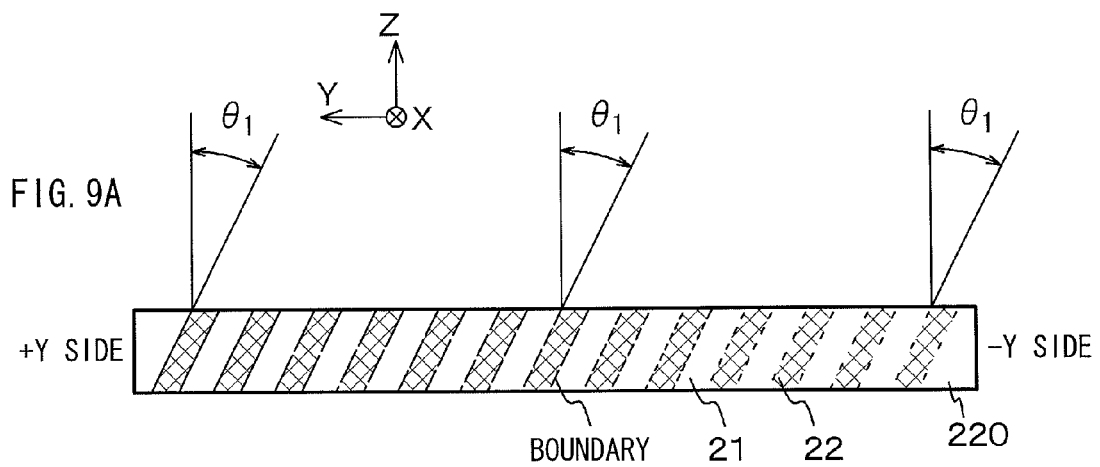
FIG. 9A is a schematic sectional diagram illustrating an example of a structure of an anisotropic scatterer according to a second embodiment.

FIG. 9A is a schematic diagram illustrating an example of the structure of the anisotropic scatterer 220 according to the second embodiment.

A region oriented in the in-plane direction of the anisotropic scatterer 220 according to the second embodiment is formed as a region where the low refractive index regions 21 and the high refractive index regions 22 are mixedly present, for example, with micron order sizes similarly to the anisotropic scatterer 20 described in the first embodiment. It is to be noted that a configuration in which the regions 21 and 22 are mixedly present with sizes smaller than micron order sizes is allowable.

The structure of the anisotropic scatterer 220 is basically the same as that of the anisotropic scatterer 20A according to the reference example which has been described with reference to FIG. 4B in description of the first embodiment. However, the anisotropic scatterer 220 is different from the anisotropic scatterer 20A in that the degree of the change in refractive index near the boundary between the low refractive index region 21 and the high refractive index region 22 is set to be continuously changed in the in-plane direction.

That is, the angle that the boundary between the low refractive index region 21 and the high refractive index region 22 makes relative to the thickness direction of the anisotropic scatterer 220 is set to an almost fixed value also in the anisotropic scatterer 220 as illustrated in FIG. 9A. For example, the angle is set to be almost fixed at the angle $\theta_1$ regardless of its position in the anisotropic scatterer 220, as with the example illustrated in FIG. 4B.

However, in the anisotropic scatterer 220, the degree of change in refractive index near the boundary between the low refractive index region 21 and the high refractive index region 22 is set to become gentler as it goes from the +Y direction side end (corresponding to the side 13A side in FIG. 2A) to the −Y direction side end (corresponding to the side 13C side in FIG. 2A) as illustrated in FIG. 9A.

Figure 9B:
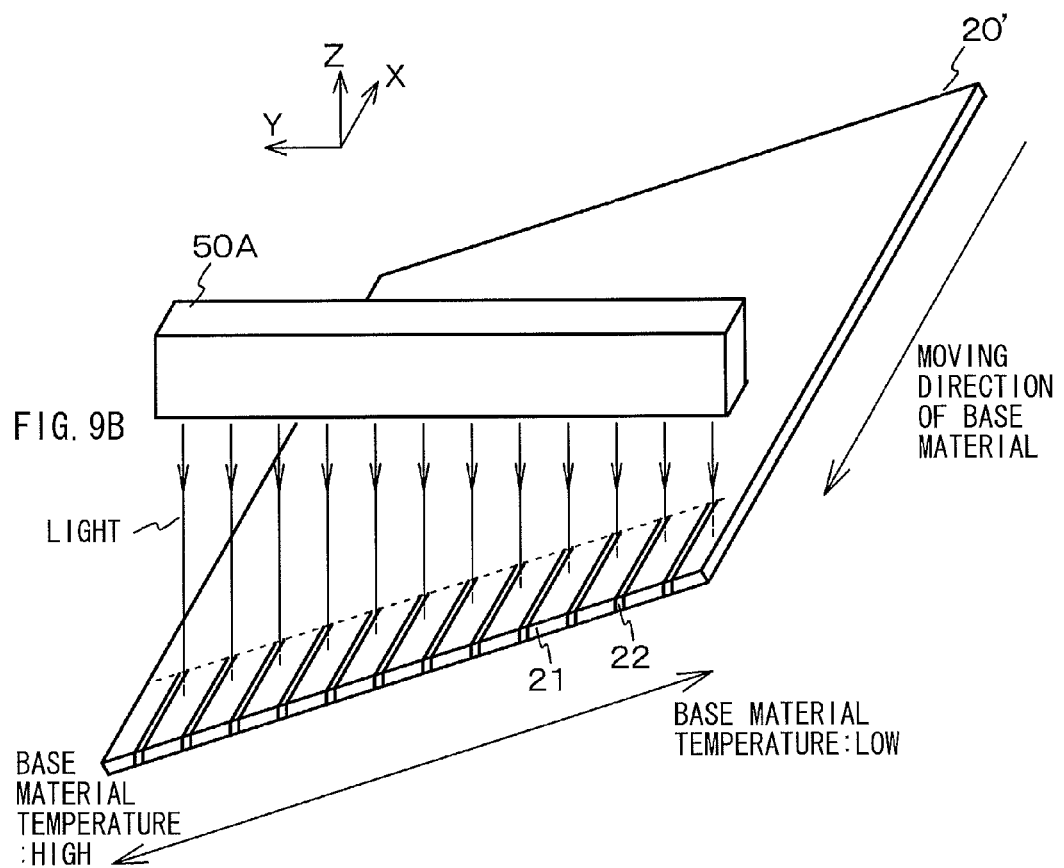
FIG. 9B is a schematic diagram illustrating an example of a method of manufacturing the anisotropic scatterer according to the second embodiment.

A method of manufacturing the anisotropic scatterer 220 will now be described with reference to FIG. 9B. It is allowed to manufacture the anisotropic scatterer 220 by irradiating a base material 20', prepared by coating a photoreactive composition that contains a photopolymerizable compound on a substrate such as, for example, the PET film or the like, with light from the light irradiation device 50A that radiates light in a fixed direction in a state that the base material 20' is set to have a predetermined temperature distribution.

Here, when the louver-shaped region is to be formed in the anisotropic scatterer 220, a light source that turns the light radiated from the light irradiation device 50A into light which is diffused in the X-axis direction and is collimated in the Y-axis direction via a not-illustrated lens or the like may be used. When the pillar region and the peripheral region surrounding the pillar region are to be formed in the anisotropic scatterer 220, a light source that turns the light radiated from the light irradiation device 50A into light which is collimated both in the X-axis and Y-axis directions via a not-illustrated lens or the like may be used.

The degree of reaction of the photoreactive composition depends on the temperature of the base material. The higher the temperature is, the more the reaction of the composition is accelerated qualitatively. Thus, it is allowed to obtain the anisotropic scatterer 220 of a structure as illustrated in FIG. 9B, by attaining a temperature distribution that the temperature of the base material 20' is decreased as it goes toward the −Y direction side as illustrated in FIG. 9B.

Figure 10A:
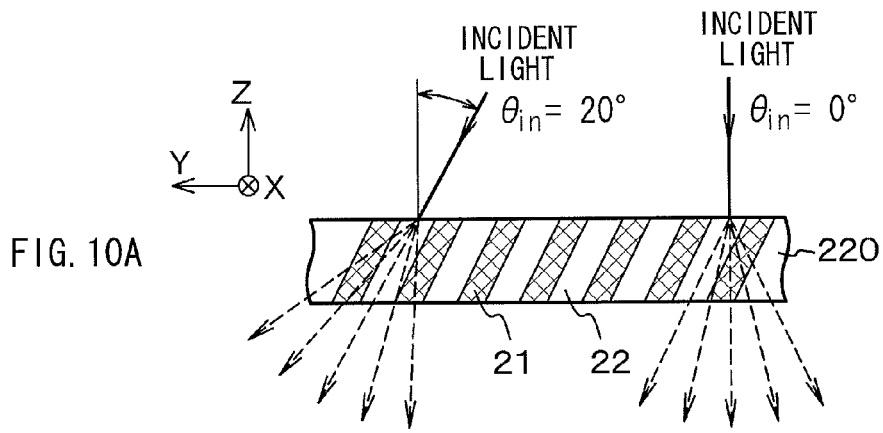
FIG. 10A is a schematic sectional diagram illustrating an example of a scattering characteristic of light which is incident upon the anisotropic scatterer when a boundary between a low refractive index region and a high refractive index region of the anisotropic scatterer is clear.
Figure 10B:
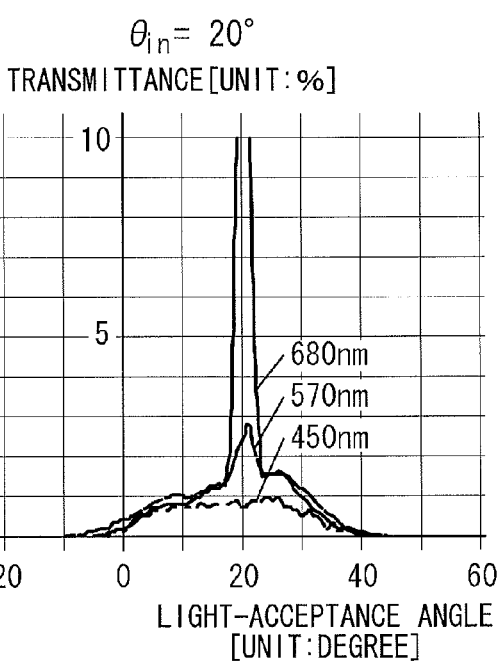
FIG. 10B and FIG. 10C are graphs, each illustrating an example of a relation between a light-acceptance angle and a transmittance of light.
Figure 10C:
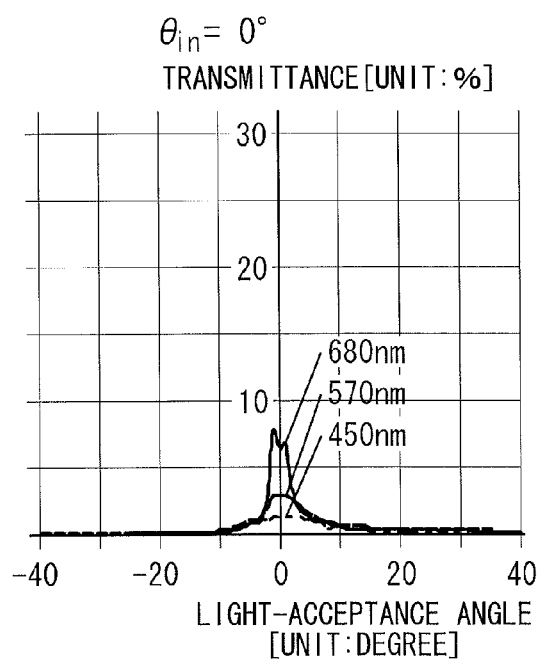
Figure 11A:
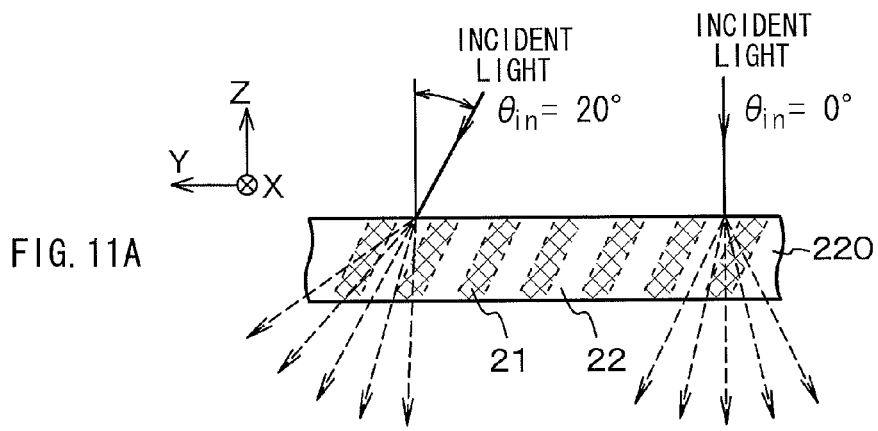
FIG. 11A is a schematic sectional diagram illustrating an example of a scattering characteristic of light which is incident upon the anisotropic scatterer when the boundary between the low refractive index region and the high refractive index region of the anisotropic scatterer is not clear.
Figure 11B:
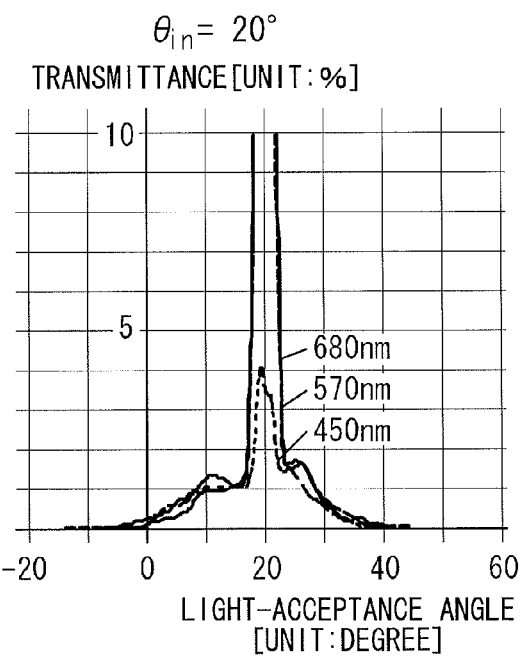
FIG. 11B and FIG. 11C are graphs, each illustrating an example of a relation between the light-acceptance angle and the transmittance of light.
Figure 11C:
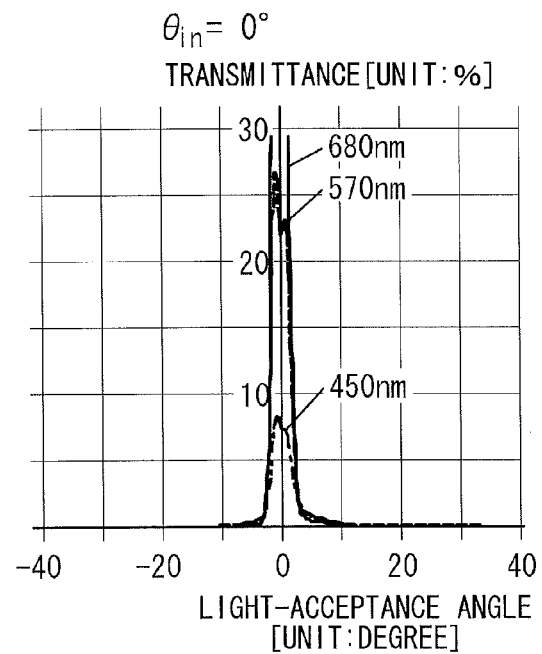

FIG. 10A is a schematic sectional diagram illustrating an example of the scattering characteristic of light which is incident upon the anisotropic scatterer 220 when the boundary between the low refractive index region 21 and the high refractive index region 22 in the anisotropic scatterer 220 is clear. FIG. 10B and FIG. 10C are graphs, each illustrating an example of a relation between a light-acceptance angle and a transmittance of light. FIG. 11A is a schematic sectional diagram illustrating an example of the scattering characteristic of light which is incident upon the anisotropic scatterer 220 when the boundary between the low refractive index region and the high refractive index region in the anisotropic scatterer 220 is not clear. FIG. 11B and FIG. 11C are graphs, each illustrating an example of a relation between the light-acceptance angle and the transmittance of light.

A spread part in the graphs of FIG. 10B and FIG. 10C, which indicates the light that scatters around, is changed to be narrowed as the boundary between the low refractive index region 21 and the high refractive index region 22 in the anisotropic scatterer 220 becomes indistinct qualitatively.

Figure 12A:
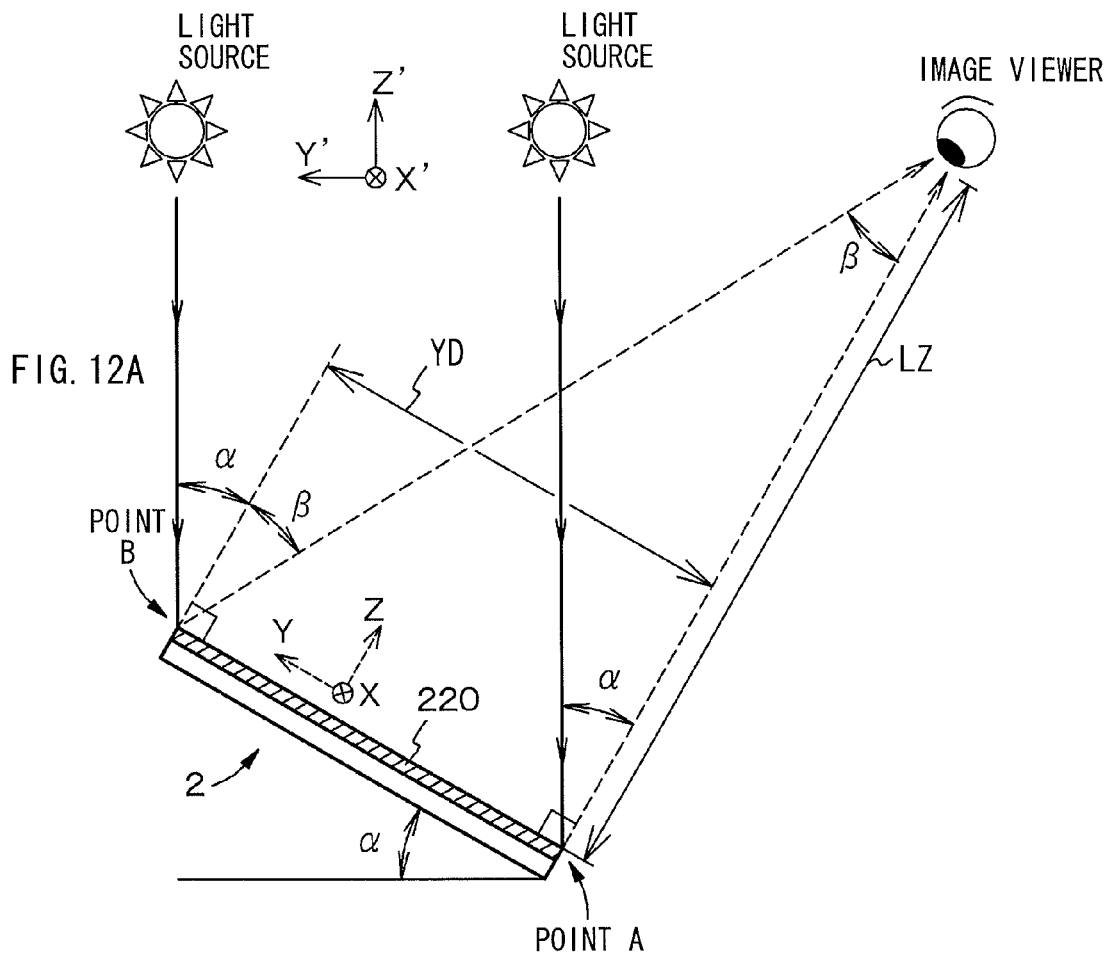
FIG. 12A is a schematic diagram illustrating an example of a positional relation between the display device and an image viewer when parallel outside light is incident.

FIG. 12A is a schematic diagram illustrating an example of a positional relation between the display device and an image viewer when parallel outside light is incident upon the device. Concretely speaking, a case that the viewer sees an image at the location of the distance LZ from the display region 11 in a state that an outside light incident direction and the normal direction of the image display section 2 makes the angle α is illustrated. The positional relation is the same as the positional direction described in the FIG. 6A.

Figure 12B:
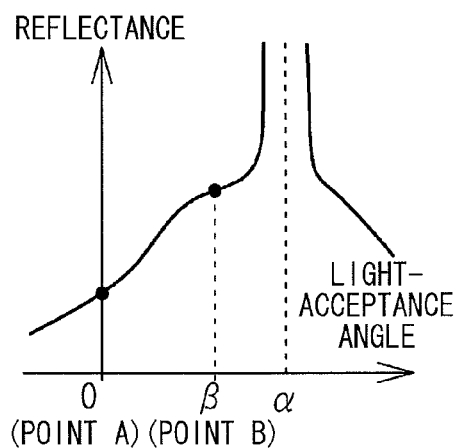
FIG. 12B is a schematic graph for illustrating a situation that the image viewer feels that the image is metal-lustrous in quality when the anisotropic scatterer according to the reference example is used.
Figure 12C:
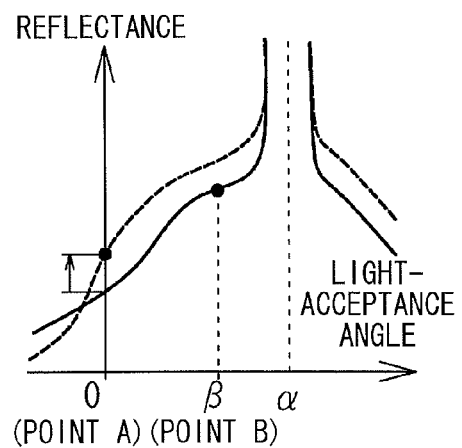
FIG. 12C is a schematic graph for illustrating a situation that it is allowed to mitigate the impression that the image is metal-lustrous in quality by using the anisotropic scatterer according to the second embodiment.

The profile of reflective light relative to the light which is incident at the angle α exhibits a characteristic, for example, as illustrated in FIG. 12B in a state that the image of the same gray-scale is being displayed on the image display section 1' using the anisotropic scatterer 20A according to the reference example as described in the first embodiment. On the other hand, since the distribution of scattering intensity of light is continuously changed in the in-plane direction on the image display section 2 using the anisotropic scatterer 220 according to the second embodiment illustrated in FIG. 9A, the profile of the reflective light at the point A is changed. Thus, since the intensity of the reflective light at the point A approaches the intensity of the reflective light at the point B as illustrated in FIG. 12C, it is allowed to mitigate the impression that the image is metal-lustrous in quality.

It is to be noted that how the degree of change in the refractive index in the vicinity of the boundary between the low refractive index region 21 and the high refractive index region 22 is to be continuously changed in the in-plane direction may be set by appropriately determining a favorable condition by experiment or the like depending on the design and specification of the image display section.

It is to be noted that although the anisotropic scatterer 220 has been described as a single member in the above description, the scatterer 220 may have the structure configured by laminating the plurality of scattering members in the same manner as that described with reference to FIG. 8 in the first embodiment.

Although some embodiments of the present disclosure have been concretely described, the present disclosure is not limited to the above mentioned embodiments and various modifications based on the technological concept of the present disclosure are possible.

Figure 13:
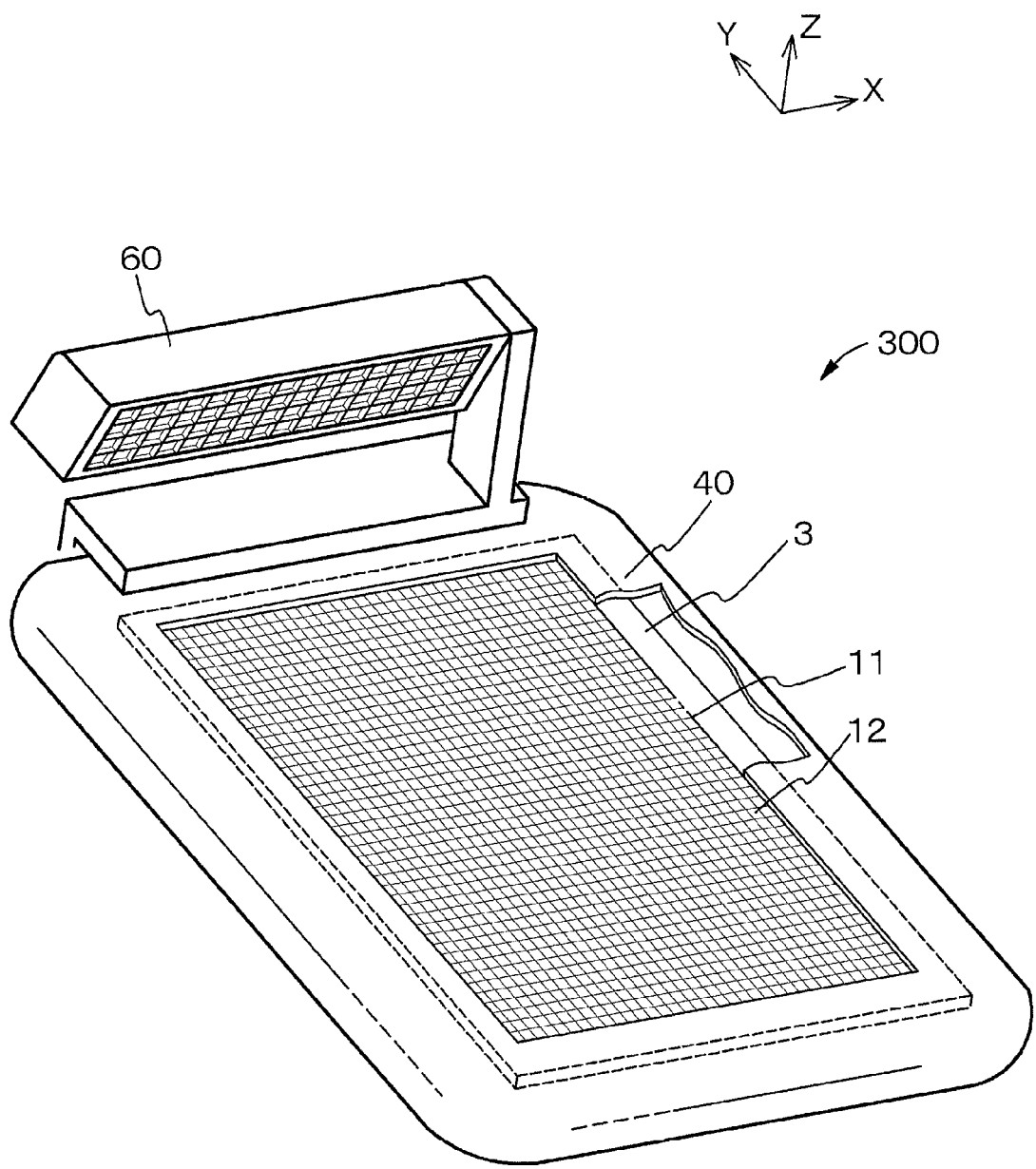
FIG. 13 is a schematic sectional diagram illustrating an example of a structure of a display device that includes a lighting system such as, for example, a reading light.

For example, in a display device 300 that includes a lighting system 60 such as, for example, a reading light as illustrated in FIG. 13, the outside light is not parallel and is incident with an angular distribution upon a reflective image display section 3.

Figure 14:
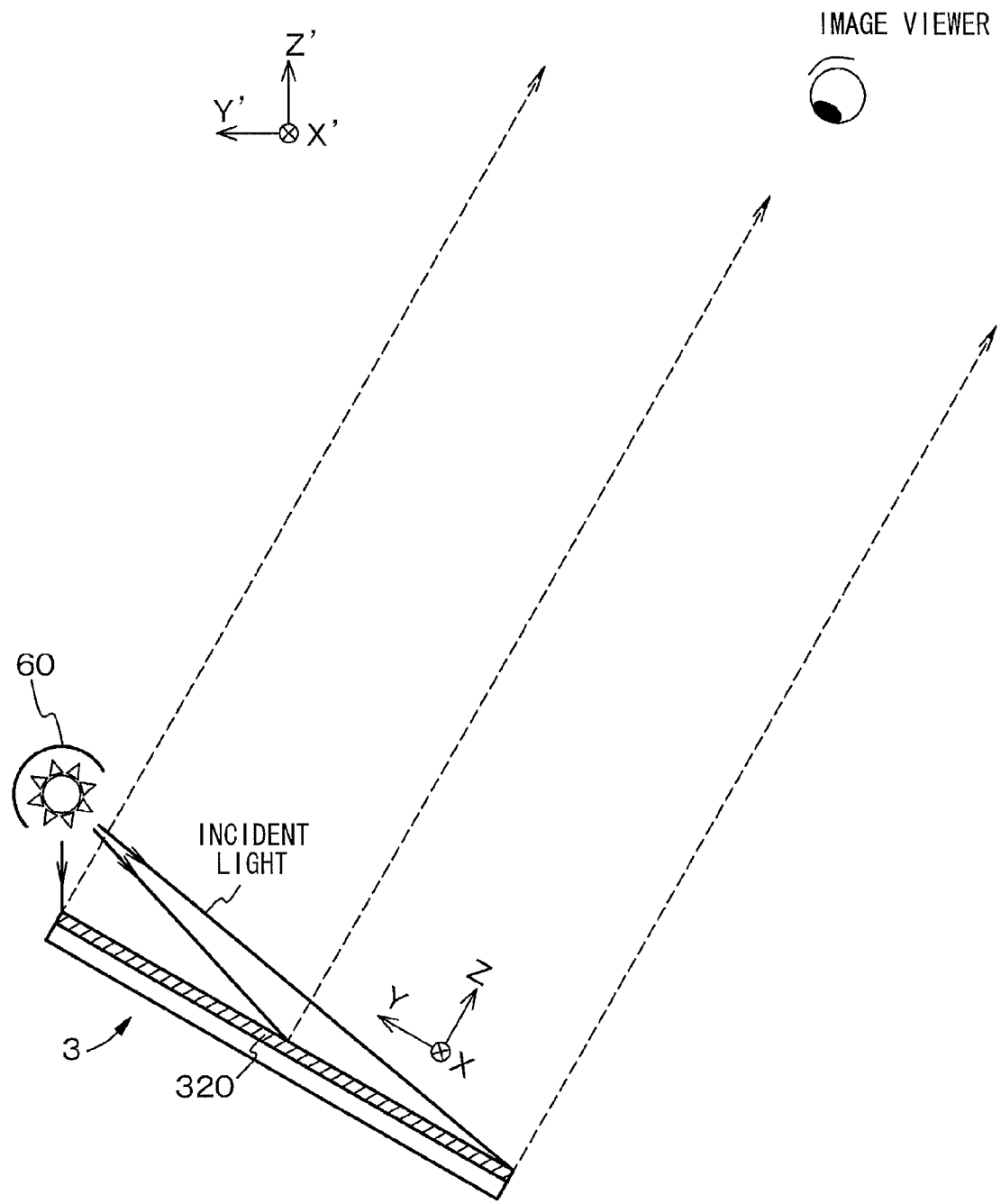
FIG. 14 is a schematic diagram illustrating an example of a relation between the display device that includes the lighting system and the image viewer.

In the above mentioned case, the positional relation between the image display section 3 and the image viewer is as illustrated in FIG. 14. Also in a configuration as mentioned above, the scattering characteristic of light is set to be continuously changed in an in-plane direction of an anisotropic scatterer 320 or/and the distribution of the scattering intensity of light is set to be continuously changed in the in-plane direction of the anisotropic scatterer 320 in consideration of the angular distribution of the incident light, by which it is allowed to mitigate the impression that the image is metal-lustrous in quality.

Accordingly, it is possible to achieve at least the following configurations from the above-described example embodiments and the modifications of the disclosure.

(1) An anisotropic scatterer, the anisotropic scatterer being configured to allow a scattering characteristic of light in a display region of a display device to have an angle dependence, and being configured to change the scattering characteristic of the light continuously in an in-plane direction.

(2) The anisotropic scatterer according to (1), wherein the anisotropic scatterer is configured to change a scattering central axis of the light continuously in the in-plane direction.

(3) The anisotropic scatterer according to (1) or (2), wherein
the anisotropic scatterer includes a region in the in-plane direction, the region having a low refractive index region and a high refractive index region that are provided mixedly in the region, and
the anisotropic scatterer is configured to change, continuously in the in-plane direction, an angle that a boundary between the low refractive index region and the high refractive index region makes relative to a thickness direction of the anisotropic scatterer.

(4) The anisotropic scatterer according to any one of (1) to (3), wherein the anisotropic scatterer is configured to change a distribution of a scattering intensity of the light continuously in the in-plane direction.

(5) The anisotropic scatterer according to any one of (1) to (4), wherein
the anisotropic scatterer includes a region in the in-plane direction, the region having a low refractive index region and a high refractive index region that are provided mixedly in the region, and
the anisotropic scatterer is configured to change, continuously in the in-plane direction, a degree of a change in refractive index near a boundary between the low refractive index region and the high refractive index region.

(6) A display device, including
a reflective image display section including an anisotropic scatterer, the anisotropic scatterer being configured to allow a scattering characteristic of light in a display region to have an angle dependence,
wherein the anisotropic scatterer is configured to change the scattering characteristic of the light continuously in an in-plane direction, to allow, upon viewing from a predetermined view position the display region in which an image of a same gray-scale is being displayed, a luminance of the image to be uniform.

(7) The display device according to (6), wherein
the image display section includes a reflective liquid crystal display panel, the reflective liquid crystal display panel having a front substrate, a rear substrate, and a liquid crystal material layer disposed between the front substrate and the rear substrate, and the anisotropic scatterer is disposed near the front substrate.

(8) The display device according to (6) or (7), wherein the anisotropic scatterer includes a plurality of scattering members that are laminated, and at least one of the scattering members is configured to change the scattering characteristic of the light continuously in the in-plane direction.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An anisotropic scatterer having a scattering characteristic of light in a display region of a display device to have an angle dependence, the anisotropic scatterer comprising:

low refractive index regions; and high refractive index regions, wherein the scatterer has: a x-direction; a y-direction; and a z-direction that is a width direction of the scatterer, the x-direction, the y-direction, and the z-direction being perpendicular to each other, wherein a y-z section that is a section of the anisotropic scatterer defined by the y-direction and the z-direction and that is vertical to a x-y plane defined by the x-direction and the y-direction, wherein the y-z section includes a plurality of parallelograms that are shapes of the high refractive index regions and that are arranged along the y-direction, wherein each of the parallelograms has a pair of sides each forming an angle with the z-direction, the pair of sides indicating high-low-index boundaries disposed between the low refractive index regions and the high refractive index regions, and wherein the angles, which are between the z-direction and the pair of sides of the parallelograms, increase continuously along the y-direction, allowing to change the scattering characteristic of the light continuously in the planar y-direction.

2. The anisotropic scatterer according to claim 1, wherein the anisotropic scatterer is configured to change a scattering central axis of the light continuously in the y-direction.

3. The anisotropic scatterer according to claim 1, wherein the anisotropic scatterer is configured to change a distribution of a scattering intensity of the light continuously in the y-direction.

4. The anisotropic scatterer according to claim 1, wherein the anisotropic scatterer includes a plurality of scattering members that are laminated, and at least one of the scattering members is the anisotropic scatterer.

5. The anisotropic scatterer according to claim 1, wherein the anisotropic scatterer has: an A-position that is the closest position of the display region from an observing point; and a B-position different from the A position, and the anisotropic scatterer has the angles increasing continuously along the y-direction such that reflective light intensity of the B-position approaches to reflective light intensity of the A-position, when the display region is illuminated by parallel outside light.

6. The anisotropic scatterer according to claim 1, wherein the anisotropic scatterer has a configuration in which the low refractive index regions and the high refractive index regions are formed in a louver shape.

7. The anisotropic scatterer according to claim 1, wherein the anisotropic scatterer has a configuration in which each of the high refractive index regions form a pillar region and the low refractive index regions surround the high refractive index regions.

8. A display device, having a reflective image display section including an anisotropic scatterer, that has a scattering characteristic of light in a display region to have an angle dependence, the anisotropic scatterer comprising:

low refractive index regions; and high refractive index regions, wherein the scatterer has: a x-direction; a y-direction; and a z-direction that is a width direction of the scatterer, the x-direction, the y-direction, and the z-direction being perpendicular to each other, wherein a y-z section that is a section of the anisotropic scatterer defined by the y-direction and the z-direction and that is vertical to a x-y plane defined by the x-direction and the y-direction, wherein the y-z section includes a plurality of parallelograms that are shapes of the high refractive index regions and that are arranged along the y-direction, wherein each of the parallelograms has a pair of sides each forming an angle with the z-direction, the pair of sides indicating high-low-index boundaries disposed between the low refractive index regions and the high refractive index regions, and wherein the angles, which are between the z-direction and the pair of sides of the parallelograms, increase continuously along the y-direction, allowing to change the scattering characteristic of the light continuously in the y-direction.

9. The display device according to claim 8, wherein the image display section includes a reflective liquid crystal display panel, the reflective liquid crystal display panel having a front substrate, a rear substrate, and a liquid crystal material layer disposed between the front substrate and the rear substrate, and the anisotropic scatterer is disposed near the front substrate.

10. The display device according to claim 8, wherein the reflective image display section includes a plurality of scattering members that are laminated, and at least one of the scattering members is the anisotropic scatterer.

11. The display device according to claim 8, wherein the anisotropic scatterer is configured to change a scattering central axis of the light continuously in the y-direction.

* * * * *